(12) United States Patent
Duricic et al.

(10) Patent No.: US 8,036,502 B2
(45) Date of Patent: Oct. 11, 2011

(54) STRESS FREE MOUNTING OF OPTICAL BENCH FOR WSS

(75) Inventors: Nenad Duricic, Ottawa (CA); Sheldon McLaughlin, Ottawa (CA); Pierre D. Wall, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 363 days.

(21) Appl. No.: 12/425,422

(22) Filed: Apr. 17, 2009

(65) Prior Publication Data

US 2009/0263080 A1 Oct. 22, 2009

Related U.S. Application Data

(60) Provisional application No. 61/045,648, filed on Apr. 17, 2008.

(51) Int. Cl.
*G02B 6/35* (2006.01)
*G02B 6/26* (2006.01)
*G02B 6/28* (2006.01)
*G02B 6/12* (2006.01)

(52) U.S. Cl. ............... 385/16; 385/14; 385/17; 385/18; 385/19; 385/24

(58) Field of Classification Search .................. None
See application file for complete search history.

(56) References Cited

U.S. PATENT DOCUMENTS

| 6,307,657 | B1 * | 10/2001 | Ford .................................. 398/9 |
| 6,549,699 | B2 * | 4/2003 | Belser et al. .................... 385/24 |
| 6,559,464 | B1 | 5/2003 | Flanders et al. ............... 250/548 |
| 6,707,959 | B2 | 3/2004 | Ducellier et al. ............... 385/17 |
| 6,771,437 | B1 | 8/2004 | Willis ........................... 359/819 |
| 6,819,824 | B1 | 11/2004 | Welsh et al. .................... 385/18 |
| 6,844,992 | B2 * | 1/2005 | Schaefer et al. ............... 359/820 |
| 7,162,115 | B2 | 1/2007 | Brophy et al. .................. 385/16 |
| 7,292,344 | B2 | 11/2007 | Atia et al. ..................... 356/454 |
| 7,330,617 | B2 * | 2/2008 | Aota et al. ...................... 385/18 |
| 7,340,128 | B2 * | 3/2008 | Shibata et al. .................. 385/24 |
| 7,358,106 | B2 | 4/2008 | Potter .......................... 438/51 |
| 7,424,182 | B2 * | 9/2008 | Matsuo et al. .................. 385/24 |
| 7,920,344 | B2 * | 4/2011 | Schoeppach et al. ......... 359/819 |
| 2002/0154855 | A1 * | 10/2002 | Rose et al. ...................... 385/24 |
| 2003/0011769 | A1 * | 1/2003 | Rakuljic et al. ............... 356/328 |
| 2004/0046248 | A1 | 3/2004 | Waelti et al. .................. 257/712 |

* cited by examiner

*Primary Examiner* — Michelle R Connelly Cushwa
(74) *Attorney, Agent, or Firm* — Teitelbaum & MacLean; Neil Teitelbaum; Doug MacLean

(57) ABSTRACT

An optical bench in a wavelength selective switch (WSS) is mounted using a combination of fixed mounts and stress-free mounts. The WSS is packaged in an enclosure including a base, a sidewall, and a lid. The optical switching engine is attached directly to the base. The optical bench is attached to the base and the optical components supported thereon are aligned with the array of switching elements of the switching engine. The optical bench is attached to the base with at plurality of mounts, which include at least one movable mount supporting movement of the optical bench in a plane parallel to the optical bench and at least one fixed mount maintaining optical alignment between the dispersive element and the array of switching elements.

19 Claims, 12 Drawing Sheets

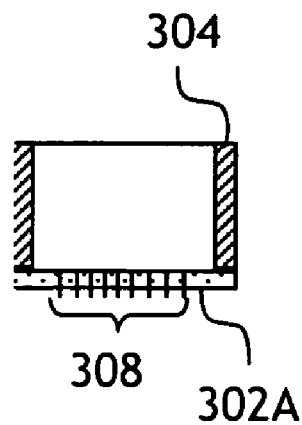
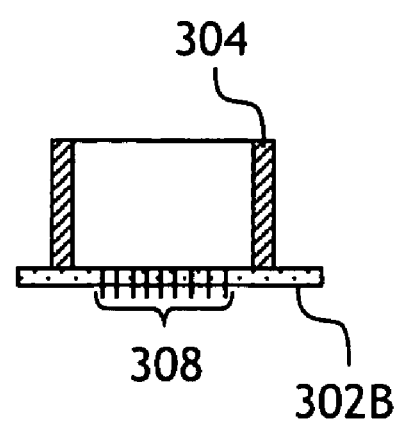
*FIG. 3A*          *FIG. 3B*
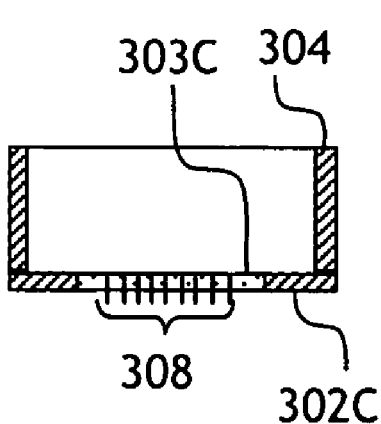
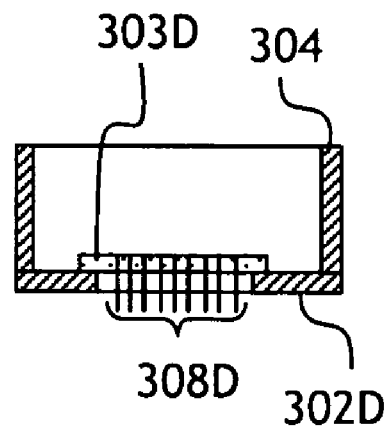
*FIG. 3C*          *FIG. 3D*

STRESS FREE MOUNTING OF OPTICAL BENCH FOR WSS

CROSS-REFERENCE TO RELATED APPLICATIONS

The present invention claims priority from U.S. Provisional Application No. 61/045,648 filed Apr. 17, 2008, which is incorporated herein by reference.

TECHNICAL FIELD

The present invention is related to optical bench mounting, and in particular to the stress-free mounting of an optical bench in a wavelength selective switch (WSS).

BACKGROUND

In an optical communication network, optical signals having a plurality of optical channels at individual wavelengths, called "wavelength channels", are transmitted from one location to another, typically through a length of optical fiber. An optical cross-connect module allows switching of optical signals from one optical fiber to another. A wavelength-selective optical cross-connect module, or a reconfigurable optical add-drop module (ROADM), allows wavelength-dependent switching, that is, it allows certain wavelength channels to be switched from a first optical fiber to a second optical fiber while letting the other wavelength channels propagate in the first optical fiber, or it allows certain wavelength channels to be switched to a third optical fiber. The new generation of ROADMs, which can switch any input wavelength to any output port, are often referred to as wavelength selective switches (WSSs).

Of the WSS architectures presently available, an architecture based on free-space optics, and including a switching engine such as a micro-electro-mechanical system (MEMS) array or a liquid crystal (LC) array, is one of the most versatile and high-performance architectures. For example, U.S. Pat. No. 6,707,959 to Ducellier et al. and U.S. Pat. No. 7,162,115 to Brophy et al, which are incorporated herein by reference, both disclose high performance optical switches.

Since WSSs are generally deployed at various nodes of an optical network, they must perform reliably in harsh environments characterized by a wide range of temperature and humidity. Accordingly, each WSS is typically packaged using a hermetic enclosure. Unfortunately, due to the relatively large footprint of the free-space optics, and due to the large number of electrical connections to the optical switching engine, mechanical packaging of WSSs represents a considerable technical challenge.

One approach to providing the required electrical connections within a hermetic enclosure has been to use a flexible printed circuit board (flex-PCB). The flex-PCB provides the electrical connection between the switching engine and the control system installed outside the enclosure, while mechanically de-coupling the switching engine from an internal multi-pin hermetic electrical connector mounted on a wall of the enclosure. Unfortunately, it takes a long time and considerable operator skill and effort to fit all the fiber feed-through, flex-PCBs, and to fit and align the optical elements inside the package, which increases the cost of the assembly and reduces manufacturing yields. Furthermore, a WSS enclosure built using this technology has a relatively large footprint since the optics, the flex-PCB, and the multi-pin hermetic connector need to be accommodated inside the package. The large size of prior art WSS enclosures is considered a drawback because telecom system providers are strongly motivated to increase the element density of their circuit cards, to facilitate a decrease in the system size and cost.

SUMMARY OF THE INVENTION

In accordance with one embodiment of the invention there is provided a wavelength selective switch module comprising an enclosure including a base, a sidewall, and a lid; an optical input port for receiving an input optical signal, the input optical signal including a plurality of wavelength channels; an optical output port for transmitting an output optical signal, the output optical signal including at least one wavelength channel in the plurality of wavelength channels; an optical switching engine attached to the base within the enclosure, the optical switching engine including an array of switching elements for directing the at least one wavelength channel from the optical input port to the optical output port; and an optical bench attached to the base within the enclosure, the optical bench supporting a plurality of optical components for optically coupling the optical input port to the array of switching elements and the optical output port, the plurality of optical components including a dispersive element for dispersing the input optical signal into the plurality of wavelength channels; wherein the optical bench is attached to the base with a plurality of mounts, the plurality of mounts including at least one movable mount supporting movement of the optical bench in a plane parallel to the optical bench and at least one fixed mount maintaining optical alignment between the dispersive element and the array of switching elements.

In accordance with one embodiment of the invention there is provided a wavelength selective switch module comprising: an enclosure including a base, a sidewall, and a lid; an optical input port for receiving an input optical signal, the input optical signal including a plurality of wavelength channels; an optical output port for transmitting an output optical signal, the output optical signal including at least one wavelength channel in the plurality of wavelength channels; an optical switching engine attached to the base within the enclosure, the optical switching engine including an array of switching elements for directing the at least one wavelength channel from the optical input port to the optical output port; and an optical bench attached to the base within the enclosure, the optical bench supporting a plurality of optical components for optically coupling the optical input port to the array of switching elements and the optical output port, the plurality of optical components including a dispersive element for dispersing the input optical signal into the plurality of wavelength channels; wherein the optical bench is attached to the base with at plurality of mounts, the plurality of mounts including at least one movable mount supporting movement of the optical bench in a plane parallel to the optical bench and at least one fixed mount anchoring the optic bench to the base in close proximity to the switching engine.

In accordance with one embodiment of the invention there is provided a wavelength selective switch comprising a housing having a base, sidewalls and a cover; optical input and output ports for receiving input optical signals and transmitting output optical signals; an optical bench for supporting a plurality of optical components including a dispersion element for dispersing the input optical signals into individual wavelength channels and for combining selected groups of the wavelength channels into the output optical signals, and lensing elements for collimating and focusing the input, output and dispersed optical signals; an array of switching elements mounted on the base of the housing for redirecting the dispersed wavelength channels to selected output ports; wherein the optical bench is connected to the base of the housing at three attachment points; wherein the attachment point nearest the array of switching elements is a fixed attachment point to substantially restrict any relative movement between the optical components on the optical bench and the switching elements; and wherein the other two attachment points are flexible attachment points to enable relative movement between the optical bench and the base of the housing, thereby accommodating for differences in thermal expansion coefficients between the optical bench and the housing.

BRIEF DESCRIPTION OF THE DRAWINGS

Further features and advantages of the present invention will become apparent from the following detailed description, taken in combination with the appended drawings, in which:

FIGS. 3A to 3D are cross-sectional views of four embodiments of a WSS enclosure;

It will be noted that throughout the appended drawings, like features are identified by like reference numerals.

DETAILED DESCRIPTION

Figure 1A:
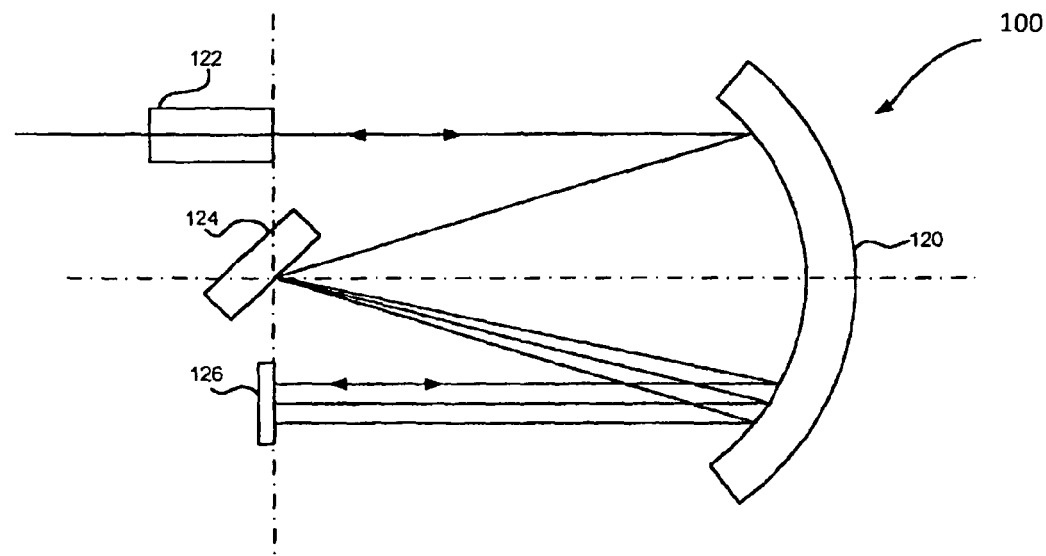
FIG. 1A is schematic diagram of prior art WSS architecture.

Referring to FIG. 1A one example of a prior-art WSS is shown. The WSS 100 includes a front end 122 for launching and receiving free-space optical beams having a plurality of wavelength channels, a concave mirror 120 for focusing and collimating optical beams, a dispersive element 124 for spatially dispersing an input optical beam into the wavelength channels, and for combining the wavelength channels into an output optical beam, and an optical switching engine 126 for selectively switching individual wavelength channels from an input optical port to an output optical port (not shown), wherein both ports are optically coupled to the front end 102. In one embodiment, the dispersive element 124 is a diffraction grating and the optical switching engine 126 is a microelectro-mechanical system (MEMS) micromirrors array. In another embodiment, the optical switching engine 126 is a liquid crystal (LC) array, such as a liquid crystal on silicon (LCOS) array.

In operation, an input optical signal is launched into the input optical port of the front end 122, and is optically coupled by the concave mirror 120 to the dispersive element 124. The dispersive element 124 spatially disperses the incoming optical beam into individual wavelength channels. The concave mirror 120 couples the wavelength channels to the optical switching engine 126, which spatially redirects the wavelength channels. Upon reflecting from the optical switching engine 126, the channels, or the beams are collimated by the mirror 120, recombined by the dispersive element 124, and focused by the mirror 120 back into the front end 122 coupled to the output optical port. Depending upon the state of individual pixels, not shown, of the optical switching engine 126, the individual wavelength channels may be attenuated, switched to the output port, or suppressed by at least 35 dB. The footprint of the optical arrangement of FIG. 1A for a 100 GHz channel spacing is approximately 2×3 inches. A detailed description of operation of the WSS schematically illustrated in FIG. 1A is provided in U.S. Pat. No. 6,707,959.

Figure 1B:
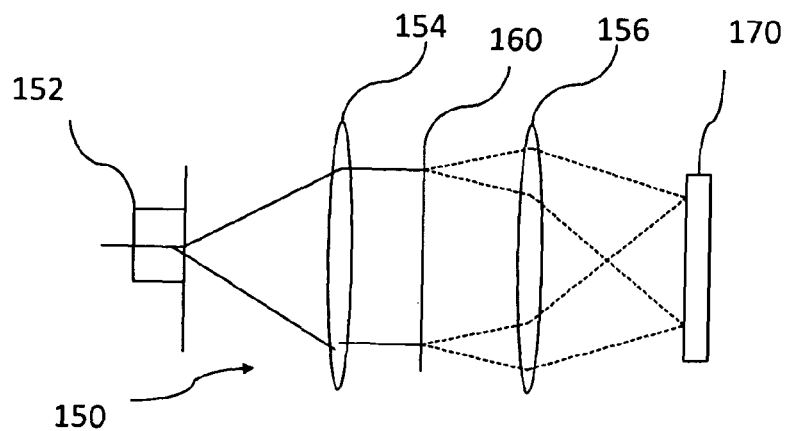
FIG. 1B is schematic diagram of prior art WSS architecture.

Referring to FIG. 1B another example of a prior-art WSS is shown. The WSS 150 includes a front end 152 for launching and receiving free-space optical beams having a plurality of wavelength channels, a first lens 154 for focusing and collimating optical beams, a dispersive element 160 for spatially dispersing an input optical beam into the wavelength channels, and for combining the wavelength channels into an output optical beam, a second lens 156 for focusing and collimating optical beams, and an optical switching engine 170 for selectively switching individual wavelength channels from an input optical port to an output optical port (not shown), wherein both said ports are optically coupled to the front end 152. In one embodiment, the dispersive element 160 is a diffraction grating or a prism. In one embodiment, the optical switching engine 170 is a MEMS array or a LC array.

In operation, an input optical signal is launched into the input optical port of the front end 152, and is optically coupled by the lens 154 to the dispersive element 160. The dispersive element 160 spatially disperses the incoming optical beam into individual wavelength channels. The second lens 156 couples the wavelength channels to the optical switching engine 170, which spatially redirects the wavelength channels. Upon reflecting from the optical switching engine 170, the channels, or the beams are collimated by the lens 156, recombined by the dispersive element 160, and focused by the lens 154 back into the front end 152 coupled to the output optical port. Depending upon the state of individual pixels, not shown, of the optical switching engine 170, the individual wavelength channels may be attenuated, switched to the output port, or suppressed by at least 35 dB. The footprint of the optical arrangement of FIG. 1B for a 100 GHz channel spacing is approximately 3×3 inches. A detailed description of operation of the WSS schematically illustrated in FIG. 1B is provided in U.S. Pat. No. 7,162,115.

Figure 2A:
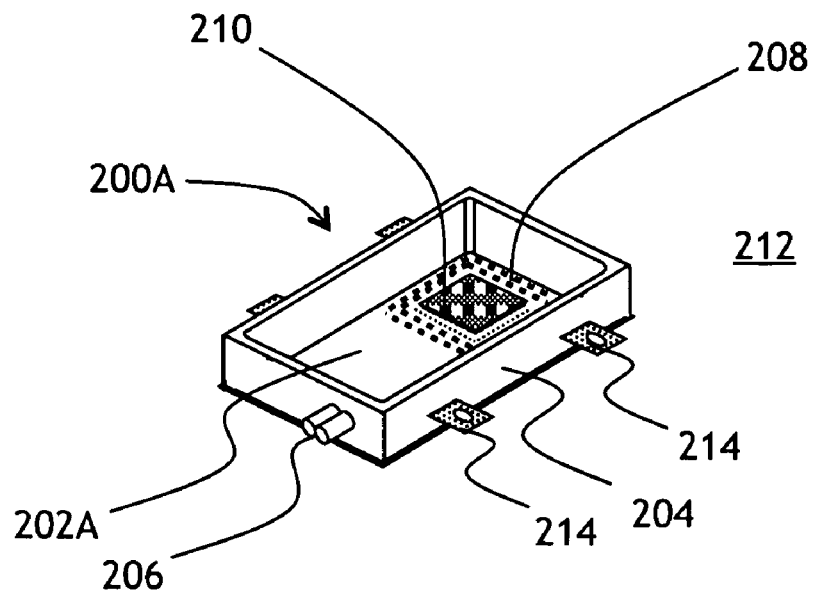
FIGS. 2A and 2B are three-dimensional views of two embodiments of a WSS enclosure.
Figure 2B:
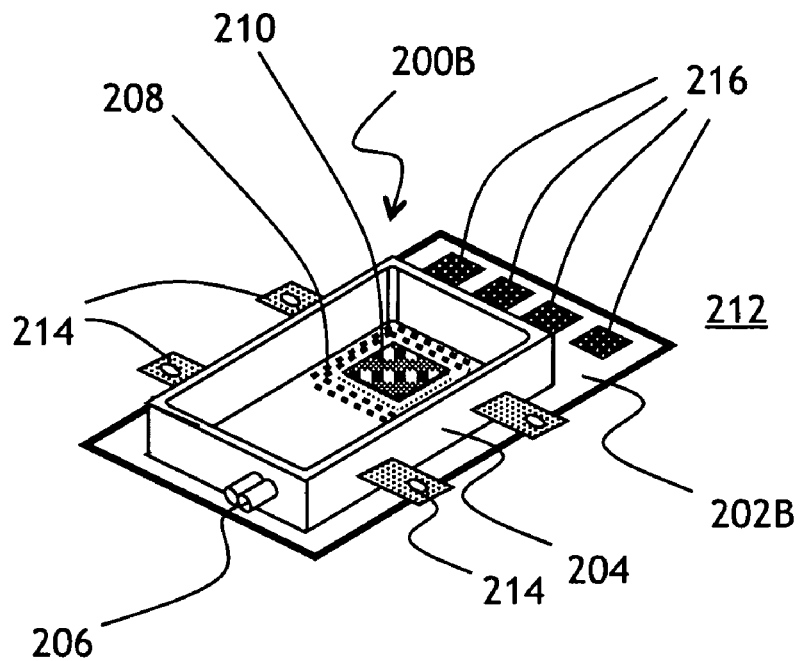

Referring now to FIGS. 2A and 2B, enclosures 200A and 200B for a WSS (e.g., such as the WSS architecture illustrated in FIGS. 1A or 1B, or any other WSS architecture utilizing a switching engine and free-space optics) are shown. The enclosures 200A and 200B include bases 202A and 202B, respectively, a closed sidewall 204, and fiber feedthroughs 206. The bases 202A and 202B are ceramic boards having connector pins 208 extending, in the downward direction in FIGS. 2A and 2B, from the bases 202A and 202B. Typically, the connector pins 208 will be brazed to the bases 202A and 202B. The switching engine 210 of the WSS (e.g., MEMS or LC array) is attached directly to the base at a location between the connector pins 208. In particular, the switching engine 210 is wirebonded to bond pads, not shown, that are in electrical contact with the pins 208. Since the switching engine 210 is attached directly to the base, rather than to a flex-PCB and internal multi-pin hermetic electrical connector mounted on a wall of the enclosure, significant reduction in the required size of the enclosure and assembly time is achieved.

In general, the sidewall 204 is made of a material with a low coefficient of thermal expansion (CTE), such as Kovar™, while the bases 202A and 202B are made of an electrically non-conducting material having a CTE that substantially matches the CTE of the sidewall 204. Designing the CTE of the sidewall and base to match each other to within 1-1.5 ppm (parts per million) per degree Celsius will typically avoid cracking of the base. For example, in one embodiment, the sidewall is fabricated from Kovar™ and the base is fabricated from a ceramic (e.g., alumina). Typically, the sidewall 204 and the base 202A or 202B will be attached together by soldering (e.g., with an AuSn alloy at a temperature of 280+−40 C), to further avoid cracking of the ceramic bases 202A and 202B. Optionally, a metallization layer is provided on the base 202A or 202B to facilitate the soldering process. For example, in one embodiment the ceramic bases 202A and 202B will include a frame of gold coating matching the perimeter of the sidewall 204, so that the latter can be brazed or soldered to the gold frame (not shown).

In FIGS. 2A and 2B, the enclosures 200A and 200B are mounted on an external system board 212 having a connector socket disposed underneath the base. The system board 212 is not a part of the enclosures 200A and 200B. The board connector socket, not shown, has a pin pattern that matches the pattern of the pins 208. Once the enclosures 200A and 200B are mounted on the board 212, the electrical connections between the enclosure 200A and the board 212 are established. Alternatively, the pins 208 can be soldered directly to the system board 212 having a matching hole and, or soldering pad pattern using, for example, a solder ball grid array. Tabs 214 soldered or brazed to the sidewall 204 are typically used to secure the enclosure 200A on the board 212.

Notably, the enclosure 200A illustrated in FIG. 2A differs from the enclosure 200B illustrated in FIG. 2B by the relative size of the bases 202A and 202B, respectively. For example, in FIG. 2A the base 202A has substantially the same footprint as the sidewall 204, whereas in FIG. 2B the base 202B has a larger footprint than a footprint of the sidewall 204. The relatively larger base allows additional electronic components 216 (e.g., driver circuitry for the switching engine 210) to be mounted on the base 202B. For example, the components 216 may include a raw electronic chip, or die, wirebonded directly to the base 202B.

Referring to FIGS. 3A, 3B, 3C, and 3D other embodiments of enclosures for a WSS (e.g., such as the WSS architecture illustrated in FIGS. 1A or 1B, or any other WSS architecture utilizing a switching engine and free-space optics). In particular, FIGS. 3A to 3D are cross-sectional views of different WSS enclosures.

FIG. 3A is a cross-sectional view of an enclosure similar to that shown in FIG. 2A, wherein the footprints of a sidewall 304 and a base 302A are substantially the same. The base 302A, which in one embodiment is made of alumina ceramic, has pins 308 extending down from the base 302A, such that the pins 308 are electrically accessible from the top and bottom of the base 302A. FIG. 3B is a cross-sectional view of an enclosure similar to that shown in FIG. 2B, wherein the footprint of the sidewall 304 is smaller than that of a base 302B. The base 302B, which in one embodiment is made of alumina ceramic, has pins 308 extending down from the base 302B, such that the pins 308 being electrically accessible from the top and bottom of the base 302B. As has been explained above, a larger footprint of the base 302B can be advantageously used for mounting of additional electronic components, not shown in FIG. 3B. FIG. 3C is a cross-sectional view of an enclosure, wherein the base 302C includes a insert 303C. For example, in one embodiment the base 302C includes an outer section that is fabricated from the same material as the sidewall 304, and a ceramic insert 303C that is fabricated from alumina ceramic. The ceramic insert 303C includes pins 308, which extend downwards such that the pins 308 are electrically accessible from the both inside and outside of the enclosure. The ceramic insert 303C runs through the entire thickness of the base 302C. In general, the insert 303C and the outer section of the base are attached flush with respect to each other, that is, the lower surfaces of the outer section of the base 302C and the insert 303C run at the same level. FIG. 3D is a cross-sectional view of an enclosure, wherein the base 302D includes an opening and an insert 303D covering that opening. For example, in one embodiment the base 302D includes an outer section that is fabricated from the same material as the sidewall 304, and a ceramic insert 303D that is fabricated from alumina ceramic. The ceramic insert 303D includes pins 308D extending downwards into the opening, such that the pins 308D are electrically accessible from the top side of the insert 303D. Furthermore, the pins 308D are mechanically and electrically accessible from an outside of the enclosure shown in FIG. 3D. In this context, the term "electrically accessible pins" means that an electrical contact may be established with the pins, typically by means of electrical traces printed on the ceramic bases 302A and 302B and the ceramic inserts 303C and 303D, from the top side of said ceramic bases and inserts.

In general, the sidewall 304 is made of a material with a low CTE, such as Kovar™, while the bases 302A, 303B, and base inserts 303C and 303D are made of an electrically non-conducting material having a CTE that substantially matches the CTE of the sidewall 304. Designing the CTE of the sidewall and base/base inserts to match each other to within 1-1.5 ppm per degree Celsius will typically avoid cracking of the base. For example, in one embodiment, the sidewall is fabricated from Kovar™ and the bases 302A an 302B and the inserts 303C and 303D are fabricated from multi-layer ceramic boards (e.g., alumina) having conductive traces printed on some of the layers of the ceramic boards for electrically connecting the pins 308 to wirebonding pads disposed on a top side thereof (not shown). Typically, the sidewall 304 and the bases 302A, 302B, 302C, 302D will be attached together by soldering (e.g., with an AuSn alloy at a temperature of 280+−40 C), to further avoid cracking. Typically, the connector pins 308 will be brazed to the bases 302A and 302B or base inserts 303C and 303D. Optionally, a metallization layer is provided on the bases 302A, 302B, 302C, 302D to facilitate the soldering process. For example, in one embodiment the ceramic bases 302A, 302B, 302C, 302D will include a frame of gold coating matching the perimeter of the sidewall 304, so that the latter can be brazed or soldered to the gold frame (not shown).

Figures 4A, 4B:
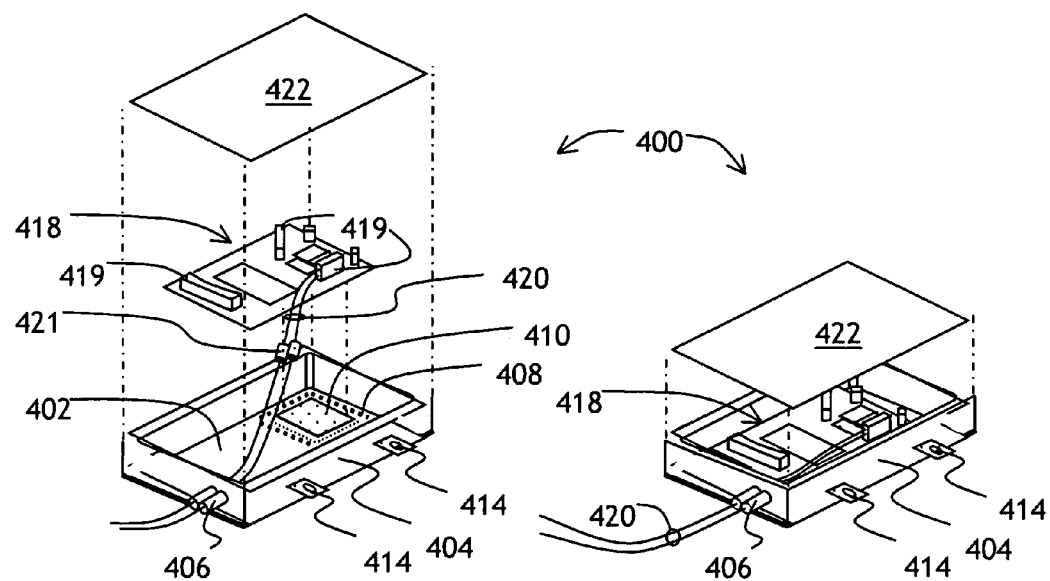
FIG. 4A is an exploded view of a WSS module.
FIG. 4B shows the assembled view of the WSS module shown in FIG. 4A with a lid elevated.

FIGS. 4A and 4B show the assembly process of a WSS module (e.g., which is based on the WSS architecture illustrated in FIGS. 1A or 1B, or any other WSS architecture utilizing a switching engine and free-space optics). Referring to FIG. 4A, which is an exploded view of the module, the module 400 includes an enclosure having a base 402, a sidewall 404, fiber feedthroughs 406, an optical switching engine 410, which in one embodiment is a MEMS or LC array, attachment tabs 414, an optical bench 418 for holding optical elements 419 thereon, input and output fibers 420 with cerrocasts 421 for sealing the fibers 420 and fitting into the feedthroughs 406, and a top lid 422 for sealing the package 400.

In general, the sidewall 404 is made of a material with a low CTE, such as Kovar™, while the base 402 is made of an electrically non-conducting material having a CTE that substantially matches the CTE of the sidewall 404. Designing the CTE of the sidewall and base to match each other to within 1-1.5 ppm per degree Celsius will typically avoid cracking of the base. For example, in one embodiment, the sidewall is fabricated from Kovar™ and the base is fabricated from alumina ceramic. Typically, the sidewall 404 and the base 402 will be attached together by soldering (e.g., with an AuSn alloy at a temperature of 280+−40 C), to further avoid cracking of the ceramic base 402. Optionally, a metallization layer is provided on the base 402 to facilitate the soldering process. For example, in one embodiment the ceramic base 402 will include a frame of gold coating matching the perimeter of the sidewall 404, so that the latter can be brazed or soldered to the gold frame (not shown).

The base 402 includes connector pins 408 extending through a thickness of the base 402. The optical switching engine 410 is attached directly (e.g., epoxied) to the base 402 at a location between the connector pins 408, where it is wirebonded to bonding pads disposed on a top side of the base 402, not shown. The bonding pads are typically electrically connected (e.g., via conductive traces in the base) to the downward extending pins 408, which are brazed to the base 402.

In general, the optical elements 419 will be pre-aligned and attached to the bench 418 using a template, not shown, for defining the positions of the optical elements 419 relative to each other and to the bench 418. The alignment is performed by affixing the template to the optical bench and by placing the optical elements and the dispersive optical element into the template. Then, the optical elements 419 are attached, typically epoxied, to the bench 418. Alternatively, another attachment method, such as glass soldering, is used to affix the optical elements 419 to the optical bench 418. In one embodiment, the optical elements 419 include the front end 122, spherical mirror 120, and dispersive element 124 illustrated in FIG. 1A. In another embodiment, the optical elements 419 include the front end 152, the first lens 154, the second lens 156, and the dispersive element 160 illustrated in FIG. 1B. In yet another embodiment, the optical elements include other free-space optics, such as turning and folding mirrors, which provide the WSS capabilities.

In general, the optical bench 418 having the optical elements 419 attached thereto will be actively aligned to the optical switching engine 410. During the active alignment step, the optical bench 418 is brought to the optical switching engine 410 using a translation and, or a rotation stage, not shown. While the position of the optical bench 418 is adjusted relative to the optical switching engine 410, an input optical signal (i.e., a test input signal) is launched into an input fiber of the fibers 420 and an output optical signal (i.e., a test output signal), is detected at an output fiber of the fibers 420, in order to achieve a pre-defined optical power level of the test output signal. After a target optical power level is achieved, the optical bench 418 is permanently attached to the base 402, with the sidewall 404 surrounding the bench 418 as shown in FIG. 4B. Then, the top lid 422 is soldered or, more typically, resistance- or laser-welded to the sidewall 404, so as to hermetically seal the assembly 400. In this context, the term "hermetically seal" means sealing as per an industry standard known as MIL-STD 883D method 1014.9, or a similar standard. For example, in one embodiment a nitrogen or argon gas purging is used before the hermetic sealing is completed.

Figure 5:
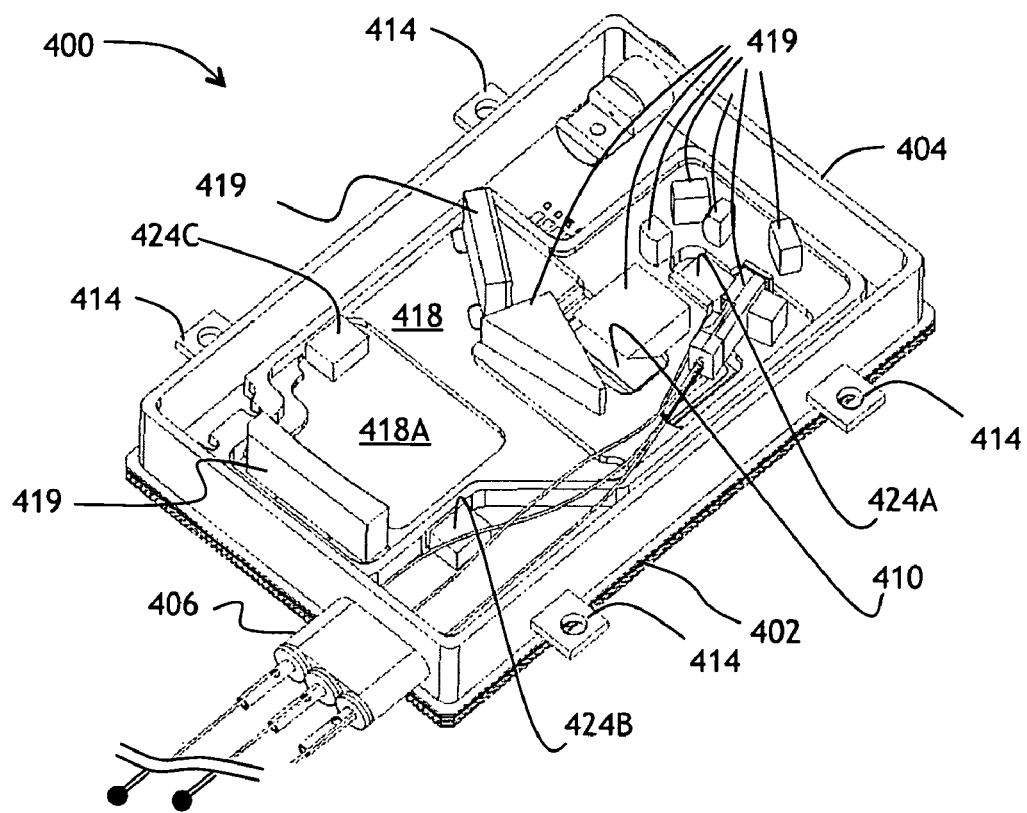
FIG. 5 is a three-dimensional view of a WSS package.

More details on the operation and assembly of modules similar to that illustrated in FIGS. 2A, 2B, 3A, 3B, 3C, 3D, 4A, and 4B can be found in U.S. Prov. Appl. No. 61/012,961 filed Dec. 12, 2007, which is incorporated herein by reference. In said application, the optical bench is described as being mounted to the ceramic base with three glass posts. For example, referring to the embodiment illustrated in FIG. 5, one of the three glass posts 424A may be disposed close to the switching engine 410, one of the three glass posts 424B may be disposed at a side edge of the optical bench 418, and one of the three glass posts 424C may disposed within an opening 418A of the optical bench 418.

One drawback of using three fixed glass posts is that a significant mismatch between the base (e.g., which may be formed from a ceramic material) and the optical bench (e.g., which is typically formed of a material having a low CTE, such as Kovar™, Invar™, or fused silica) will result in stress in the materials when changes in temperature occur. This thermal stress, which may result in the optical bench bending and/or moving out-of plane, will typically weaken the epoxy or glass soldering of the mounts (e.g., on the glass posts) and/or negatively affect the alignment of the free-space optics 419 on the bench with the switching engine 410 attached to the base. As a result, optical performance degradation, thermal fatigue of the mounting elements, and/or WSS failure are possible.

In accordance with one embodiment of the instant invention an optical bench for a WSS is secured in an enclosure similar to that described above (e.g., with regard to FIGS. 2A, 2B, 3A, 3B, 3C, 3D, 4A, or 4B) using a combination of one or more fixed mounts and one or more movable mounts (i.e., stress-free mounts). The one or more fixed mounts ensure the long-term stability of the device. The one or more movable mounts reduce thermal stress, thus increasing the range of temperature for which the WSS may be operated with little or no optical performance degradation.

Figure 6A:
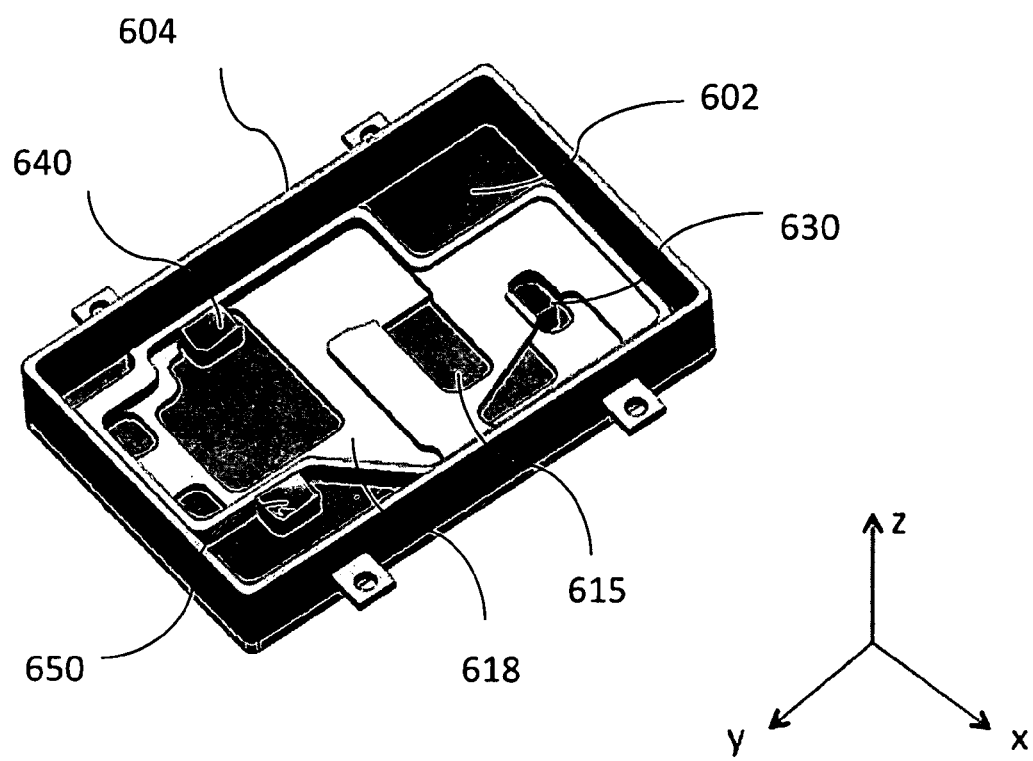
FIG. 6A is a three-dimensional of a WSS package showing an optical bench mounted in accordance with one embodiment of the instant invention.
Figure 6B:
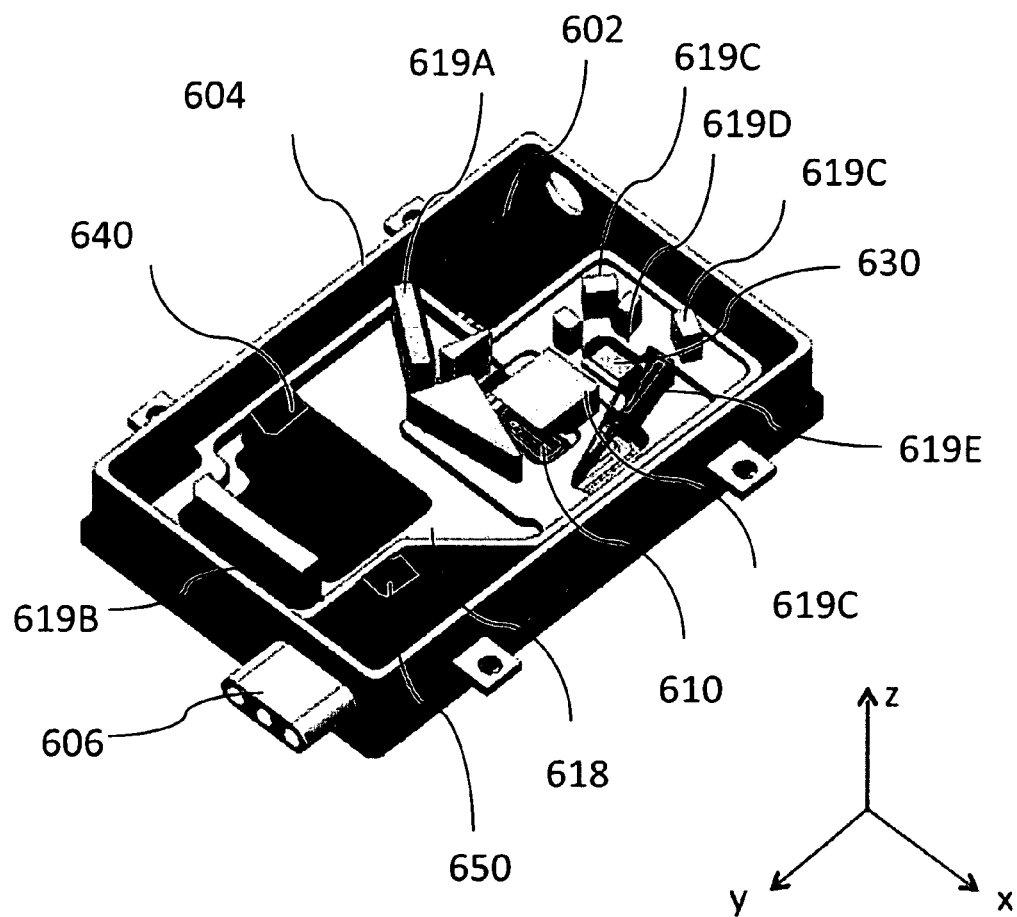
FIG. 6B shows the WSS package illustrated in FIG. 6A wherein the optical bench is populated.

Referring to FIGS. 6A and 6B, a WSS module in accordance with one embodiment of the instant invention is shown. In FIG. 6A, the switching array 610, free space optics 619A-E, input/output ports 606, and lid (not shown) have been omitted to clearly illustrate how the optical bench 618 is mounted on the base 602 within the sidewall 604. More specifically, FIG. 6A shows that the optical bench 618 is mounted above the base 602 with a fixed mount 630, a first movable mount 640, and a second movable mount 650. In FIG. 6B, the optical bench 618 is populated with various frees-space optics, such as a dispersive element 619A, a concave mirror 619B, reflectors 619C, lenses 619D, and an input/output lens array 619E. FIG. 6B also shows the switching engine 610 directly attached to the base 602.

In general, the sidewall 604 is made of a material with a low CTE, such as Kovar™ or Invar™, while the base 602 is made of an electrically non-conducting material having a CTE that substantially matches the CTE of the sidewall 404. Designing the CTE of the sidewall and base to match each other to within 1-1.5 ppm per degree Celsius will typically avoid cracking of the base. For example, in one embodiment, the sidewall is fabricated from Kovar™ and the base is fabricated from alumina ceramic (e.g. $AlO_x$). Typically, the sidewall 604 and the base 602 will be attached together by soldering (e.g., with an AuSn alloy at a temperature of 280+−40 C), to further avoid cracking of the ceramic base 602. Optionally, a metallization layer is provided on the base 602 to facilitate the soldering process. For example, in one embodiment the ceramic base 602 will include a frame of gold coating matching the perimeter of the sidewall 604, so that the latter can be brazed or soldered to the gold frame (not shown).

The base 602 includes connector pins (not shown), which extend through a thickness of the base 602. The optical switching engine 610 is attached directly to the base 602 at a location between the connector pins (not shown), where it is wirebonded to bonding pads (not shown) disposed on a top side of the base 602. The bonding pads are typically electrically connected (e.g., via conductive traces in the base) to the downward extending pins, which are brazed to the base 602.

The optical bench 618 includes an upper surface for supporting the free-space optics 619A-E and an opening 615, which is positioned such that it is over the switching engine 610 when the optical bench 618 is placed within the sidewall 604. The optical bench 618 is suspended above the base 602 with the fixed mount 630, the first movable mount 640, and the second movable mount 650. The fixed mount 630 couples a first end of the optical bench to the base 602, while the movable mounts 640 and 650 couple a second opposite end of the optical bench to the base. The fixed mount 630 is positioned in close proximity to the switching element 610, which advantageously helps to maintain optical alignment between the free-space optics (e.g., 619A) and the switching element 610. The movable mounts 640, 650 are positioned remotely from the switching element 610 in close proximity to the opposite end of the optical bench 618, in positions selected to provide well-balanced support of the optical bench 618. Positioning the movable mounts 640, 650 in a remote position from the switching element 610 advantageously allows limited movement of the optical bench 618, thus reducing stress, while still maintaining optical alignment between the free-space optics 619A-E and the switching element 610.

The fixed mount 630, which is schematically illustrated as a block, typically includes a rigid post, which is fixedly attached to the base 602 and fixedly attached to the optical bench 618. For example, in one embodiment the fixed mount 630 is a glass post having a square, circular, hexagonal, or other cross-section, which is epoxied or glass soldered to both the base 602 and the optical bench 618. In another embodiment the fixed mount 630 is a metal post fabricated from a low CTE material such as Kovar™ or Invar™, which is epoxied or mechanically fastened to the base 602 and the optical bench 618.

Each movable mount 640, 650, which is schematically illustrated as a block, typically includes a rigid post, which is fixedly attached to the base 602, and which is attached to the optical bench 618 in a manner that supports movement of the optical bench 618 in a plane parallel to the optical bench (i.e., movement in the x and/or y directions).

Figure 7:
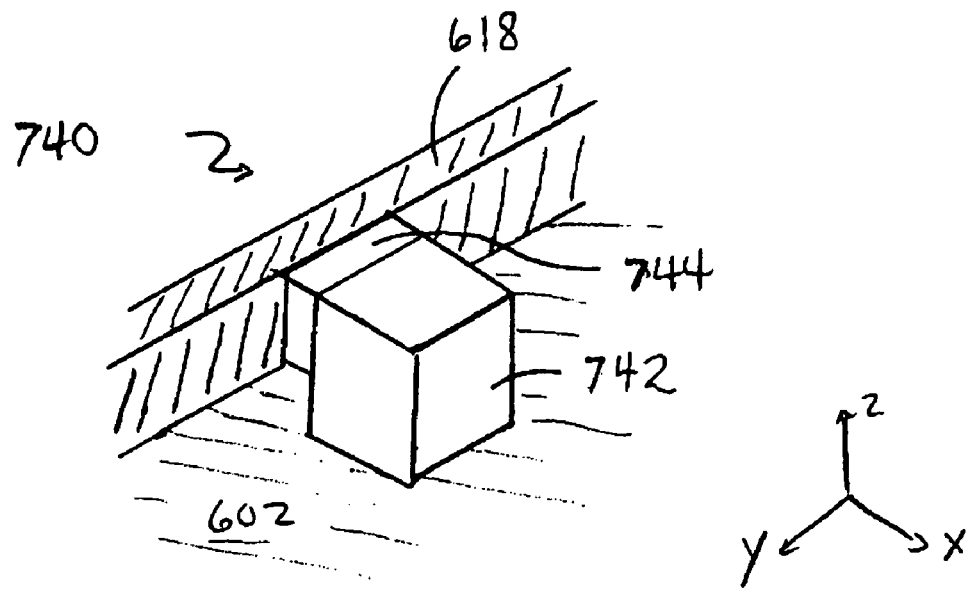
FIG. 7 is a schematic diagram of a movable mount in accordance with an embodiment of the instant invention.

Referring to FIG. 7 there is shown an embodiment of a movable mount for mounting the optical bench 618, in accordance with an embodiment of the invention. The movable mount 740 includes a rigid post 742 and a resilient connector 744. The rigid post 742 includes a first end that is fixedly attached to the base 602 (e.g., epoxied or soldered), and a second opposite end that is attached to the resilient connector 744. In general, the rigid post 742 will be fabricated from a material having a low CTE. For example, in one embodiment the rigid post 742 is fabricated from glass, Kovar™, or Invar™. The resilient connector 744 couples a side of the optical bench 618 to a side of the rigid post 742. In general, the resilient connector 744 will be fabricated from an elastic material. For example, in one embodiment the resilient connector 744 is a compliant adhesive, such as Loctite 5404™, which connects the optical bench 618 and the rigid post 742. In another embodiment, the resilient connector 744 is an elastic insert, which is epoxied and/or mechanically fastened to both the optical bench 618 and the rigid post 744. Some examples of materials suitable for fabricating the elastic insert include Isodamp™ and VersaDamp™.

The resilient connector 744 permits restricted movement along each of the x, y, and z axes. The amount of movement will be determined, at least in part, by the elasticity of the elastic material and the dimensions of the resilient connector 744. In general, the elasticity and dimensions of the elastic material will be selected to provide sufficient movement to reduce stress, yet sufficient stiffness to support the optical bench while minimizing damage to the device when the device is exposed to vibration and/or impact. The amount of movement will also be determined by the position of the rigid post 742. For example, positioning the movable mount 640 to a side of the optical bench, as illustrated in FIGS. 6A and 6B, will physically limit the amount of movement in a direction parallel to the x-axis, but advantageously will permit a larger amount of movement in the direction in which the largest expansion/contraction occurs (i.e., parallel to the y-axis).

Figure 8:
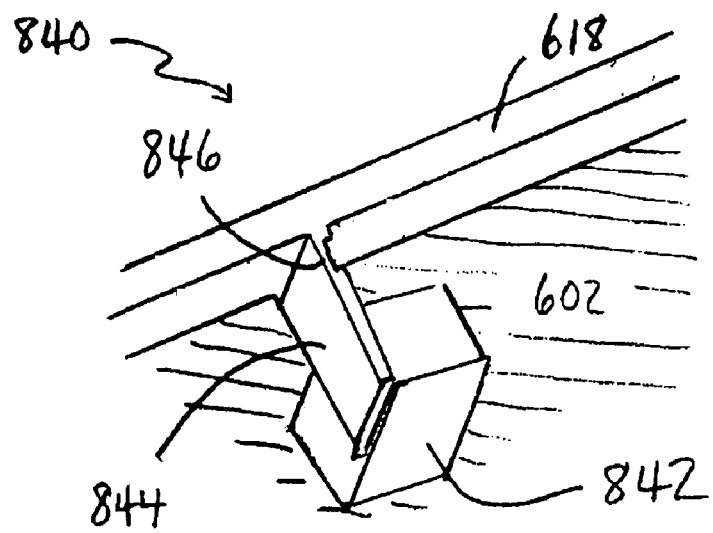
FIG. 8 is a schematic diagram of a movable mount in accordance with another embodiment of the instant invention.

Referring to FIG. 8 there is shown an embodiment of a movable mount for mounting the optical bench 618, in accordance with another embodiment of the invention. The movable mount 840 includes a rigid post 842 and a resilient connector 844. The rigid post 842 includes a first end that is fixedly attached to the base 602 (e.g., epoxied or soldered), and a second opposite end that is attached to the resilient connector 844. In general, the rigid post 842 will be fabricated from a material having a low CTE. For example, in one embodiment the rigid post 842 is fabricated from glass, Kovar™, or Invar™. The resilient connector 844 includes a flexible arm that projects from the side of the optical bench 618. The flexible arm, which is an extension of the optical bench 618, couples a side of the optical bench 618 to a side of the rigid post 842. The distal end of the flexible arm is attached to the rigid post 842 (e.g., epoxied, soldered, or mechanically fastened), while the end closest to the optical bench includes a thin region 846 where the flexible arm is easily bent.

The resilient connector 844 permits restricted movement of the optical bench 618 in a direction parallel to the x-axis, a relatively large amount of movement of the optical bench in a direction parallel the y-axis, and little or no movement of the optical bench in a direction parallel to the z-axis. The amount of movement in the y-direction will be determined, at least in part, by the thickness of the thin region 846. The amount of movement in the z-direction will be determined, at least in part, by the height of the flexible arm.

Advantageously, the resilient connector 844 permits the greatest amount of movement in a direction parallel to the direction in which the largest expansion/contraction occurs (e.g., parallel to the y-axis). Accordingly, the amount of stress can be significantly reduced. Further advantageously, the resilient connector 844 permits little or no movement in a direction perpendicular to the plane at which the largest expansion/contraction occurs (i.e., restricts movement along the z-axis). Accordingly, the WSS module may be exposed to vibration and/or impact without significant effects on the optical performance and/or long-term stability of the WSS.

Figure 9A:
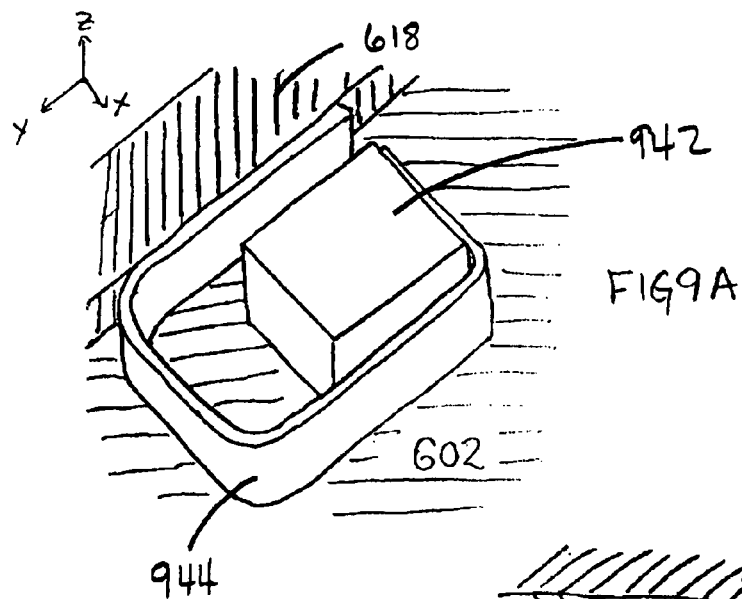
FIG. 9A is a schematic diagram of a movable mount in accordance with yet another embodiment of the instant invention.
Figure 9B:
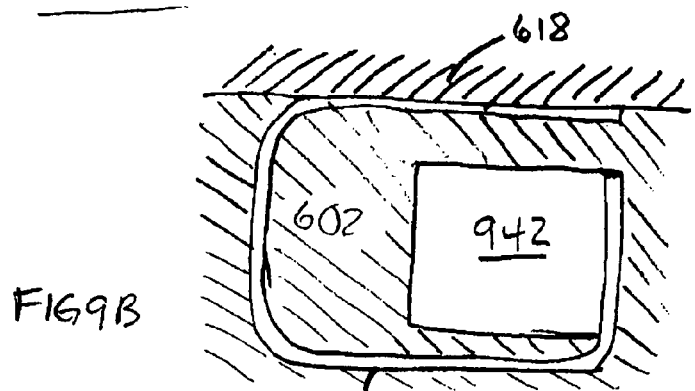
FIG. 9B is a plan view of the movable mount illustrated in FIG. 9A.
Figure 9C:
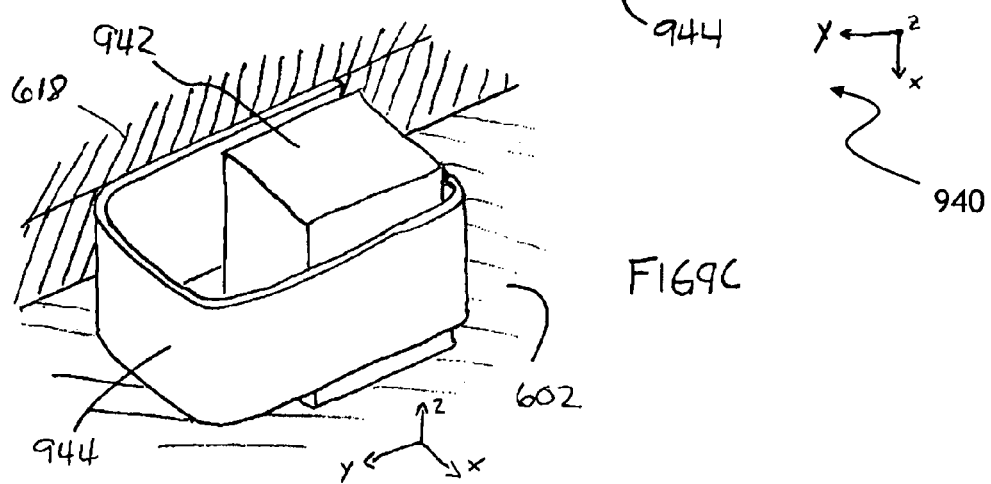
FIG. 9C is a perspective view of the movable mount illustrated in FIG. 9A.

Referring to FIGS. 9A, 9B, and 9C there is shown an embodiment of a movable mount for mounting the optical bench 618, in accordance with another embodiment of the invention. The movable mount 940 includes a rigid post 942 and a resilient connector 944. The rigid post 942 includes a first end that is fixedly attached to the base 602 (e.g., epoxied or soldered), and a second opposite end that is attached to the resilient connector 944. In general, the rigid post 942 will be fabricated from a material having a low CTE. For example, in one embodiment the rigid post 942 is fabricated from glass, Kovar™, or Invar™. The resilient connector 944 includes a clip that couples a side of the optical bench 618 to a side of the rigid post 942. More specifically, the resilient connector 944 includes a band of material that is looped around the rigid post 942 such that the band of material surrounds the rigid post 942 on at least three sides. The optical bench 618 is attached to one end of the band of material at an outside edge of the loop, while the rigid post 942 is attached to the opposite end of the band of material at an inner edge of the loop. For example, in one embodiment the band of material is epoxied, soldered, and/or mechanically attached to the optical bench 618 and rigid post 942. In one embodiment, the band of material is fabricated from the same material as the optical bench and/or rigid post.

The resilient connector 944 permits a relatively large amount of movement of the optical bench in a direction parallel to the x-axis and parallel to the y-axis, and little or no movement of the optical bench in a direction parallel to the z-axis. The amount of movement in the x- and y-directions will be determined, at least in part, by the type and thickness of the band of material used to form the loop. The amount of movement in the z-direction will be determined, at least in part, by the height of the clip (i.e., the width of the band of material).

Advantageously, the resilient connector 944 permits the greatest amount of movement in a plane in which the largest expansion/contraction occurs (e.g., the xy-plane). Accordingly, the amount of stress can be significantly reduced. Further advantageously, the resilient connector 944 permits little or no movement in a direction perpendicular to the plane at which the largest expansion/contraction occurs (i.e., limits movement along the z-axis). Accordingly, the WSS module may be exposed to vibration and/or impact without significant effects on the optical performance and/or long-term stability of the WSS.

Figure 10:
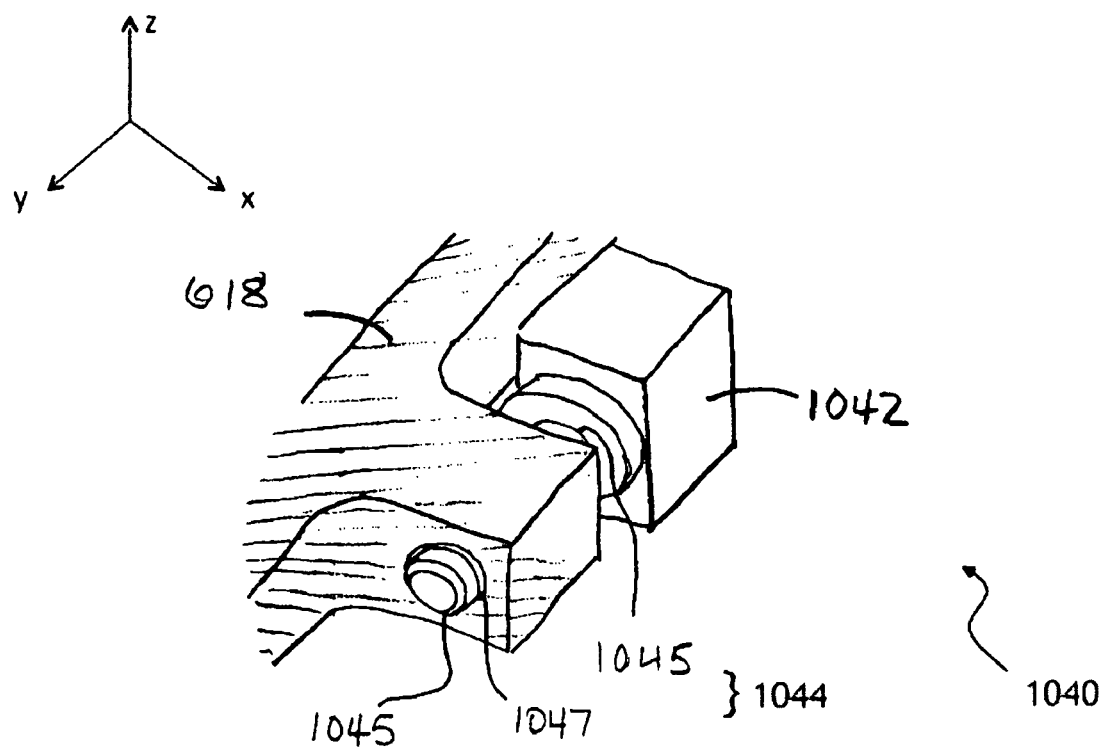
FIG. 10 is a schematic diagram of a movable mount in accordance with yet another embodiment of the instant invention.

Referring to FIG. 10 there is shown an embodiment of a movable mount for mounting the optical bench 618, in accordance with another embodiment of the invention. The movable mount 1040 includes a rigid post 1042 and a resilient connector 1044. The rigid post 1042 includes a first end that is fixedly attached to the base 602 (e.g., epoxied or soldered), and a second opposite end that is attached to the resilient connector 1044. In general, the rigid post 1042 will be fabricated from a material having a low CTE. For example, in one embodiment the rigid post 1042 is fabricated from glass, Kovar™, or Invar™. The resilient connector 1044 includes first and second cylinders that fit together to form a piston 1045. More specifically, the first cylinder fits snuggly within the second cylinder such that when the first cylinder moves toward the second cylinder a dampening fluid (e.g., water, air, or other) in the second cylinder 1048 is compressed. One end of the piston 1045 is fixedly attached to a side of the rigid post 1042 (e.g., epoxied, soldered, or mechanically fastened). An opposite end of the piston 1045 is attached to the optical bench 618, where it is inserted in an opening thereof. A resilient ring or sleeve 1047, which surrounds the piston 1045 in the opening, cushions the piston 1045 and provides a tight fit within the opening.

The resilient connector 1044 permits a relatively large amount of movement of the optical bench in a direction parallel the y-axis, and restricted movement of the optical bench in directions parallel to the z-axis and x-axis. The amount of movement in the x- and z-directions will be determined, at least in part, by the thickness and elasticity of the resilient ring or sleeve 1047. The amount of movement in the y-direction will be determined, at least in part, by the dampening fluid.

Advantageously, the resilient connector 1044 permits the greatest amount of movement in a direction parallel to the direction in which the largest expansion/contraction occurs (e.g., parallel to the y-axis), and a relatively small amount of movement in direction perpendicular to the plane at which the largest expansion/contraction occurs (i.e., limits movement along the z-axis). Accordingly, the WSS module may be exposed to vibration and/or impact without significant effects on the optical performance and/or long-term stability of the WSS.

Figure 11:
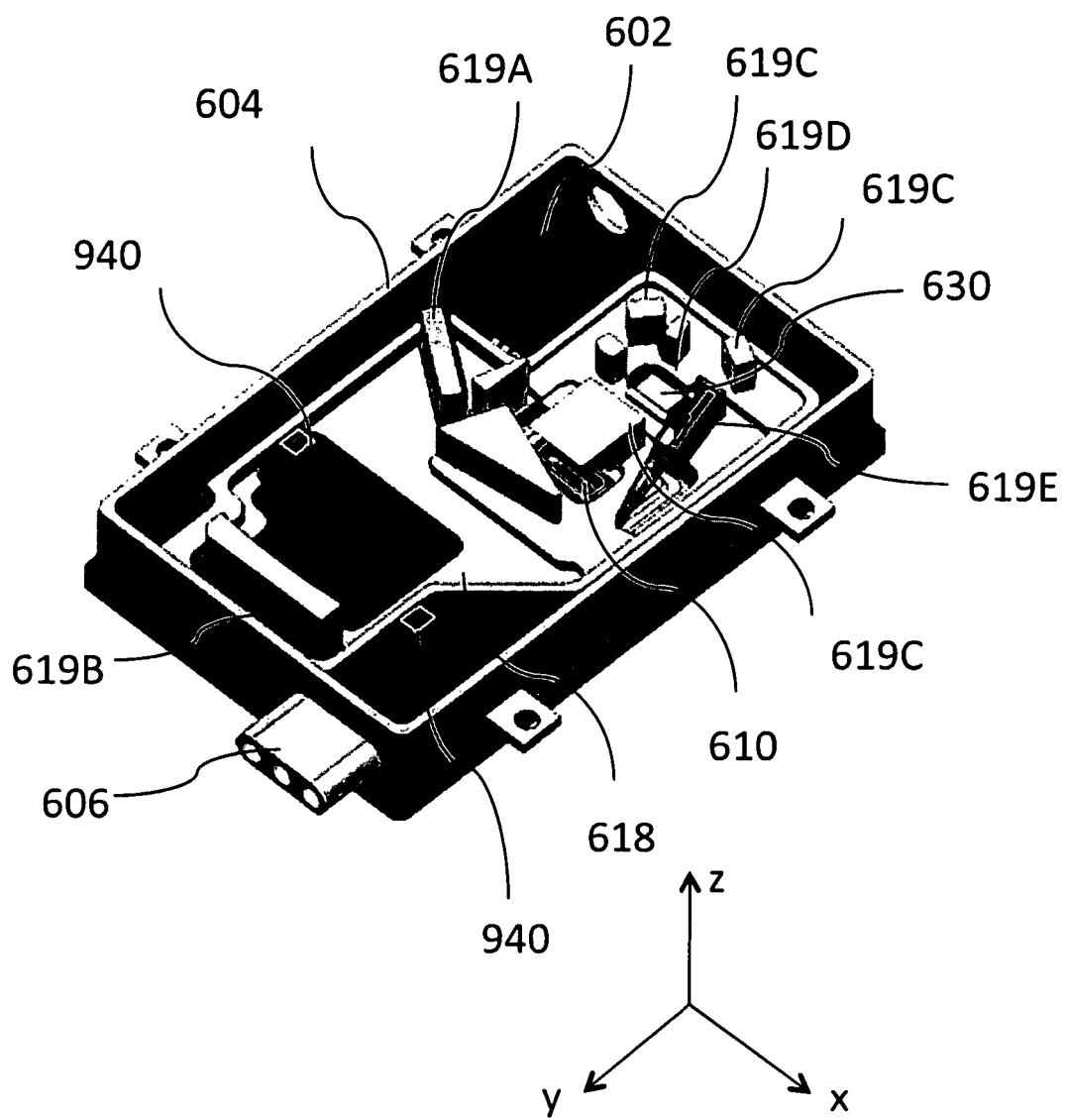
FIG. 11 is a schematic diagram of a WSS package including an optical bench mounted in accordance with an embodiment of the instant invention using the movable mount illustrated in FIG. 9A.

In each of the above-described embodiments, the one or more movable mounts 740, 840, 940, and 1040 are illustrated showing the rigid posts 742, 842, 942, and 1042, respectively, positioned to one side of the optical bench, as illustrated in FIGS. 6A and 6B. For example, referring to FIG. 11, providing the movable mounts 740 to the sides of the optical bench such that the fixed mount 630 and movable mounts 740 form a three-point attachment, advantageously anchors the bench 618 close to the switching engine 610 while also allowing maximum movement in the plane parallel to the base 602.

Figure 12:
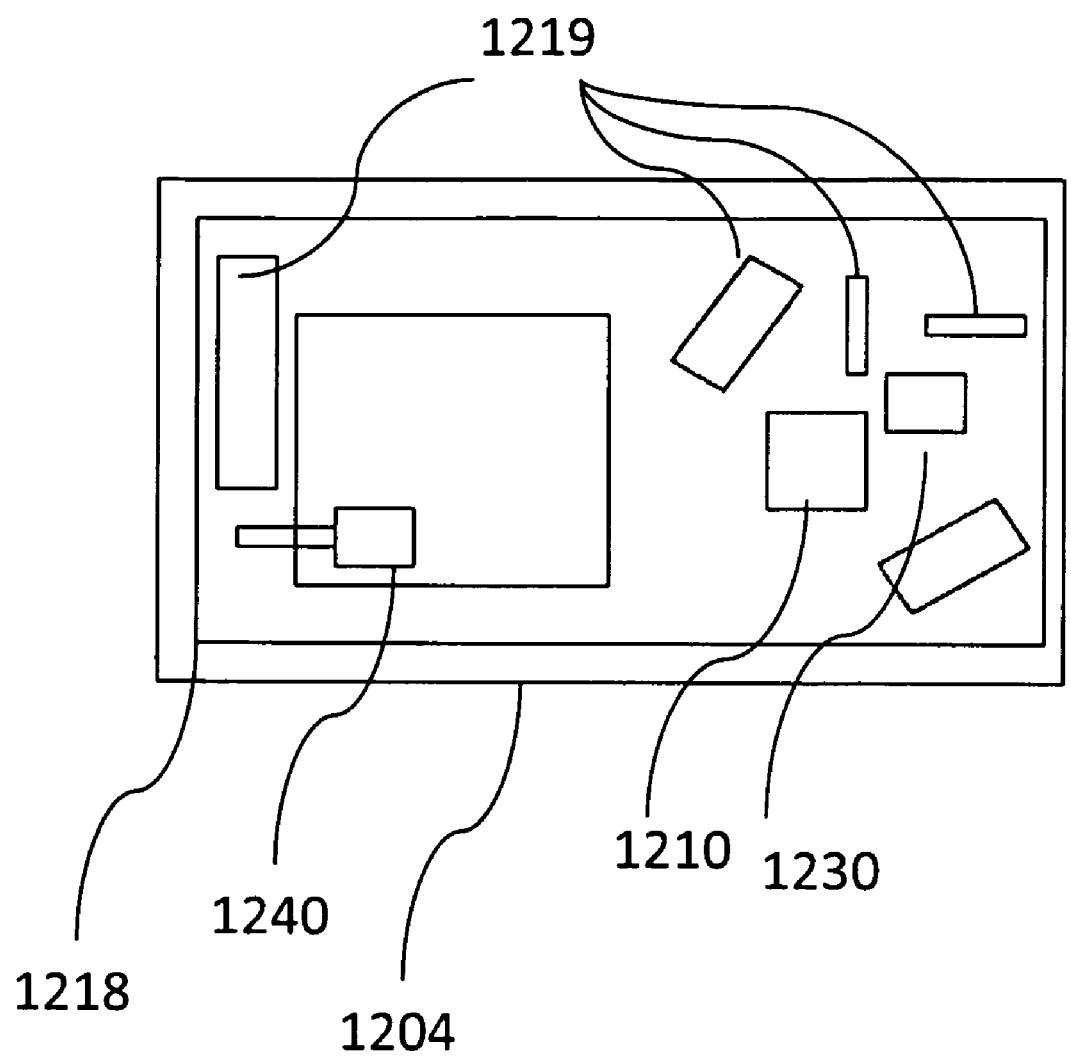
FIG. 12 is plan view of a WSS package showing an optical bench mounted in accordance with another embodiment of the instant invention.

In other embodiments, the one or more movable mounts 740, 840, 940, and 1040 may be positioned at the ends of optical bench. For example, referring to FIG. 12, a WSS module in accordance with another embodiment of the instant invention is shown. The WSS module includes a switching array 1210 and free space optics 1219. For illustrative purposes the input/output ports 606 and lid are not shown. The free space optics 1219 are supported on an optical bench 1218 within a closed sidewall 1204 using a fixed mount 1230 and a movable mount 1240. The fixed mount 1230 couples a first end of the optical bench to the base of the enclosure, while the movable mount 1240 couples a second opposite end of the optical bench to the base. The fixed mount 1230 is positioned in close proximity to the switching element 1210, which advantageously helps to maintain optical alignment between the free-space optics (e.g., 1219) and the switching element 1210. The movable mount 1240 is positioned remotely from the switching element 1210 at an opposite end of the optical bench 1218. Positioning the movable mount 1240 in a remote position from the switching element 1210 advantageously allows limited movement of the optical bench 1218, thus reducing stress, while still maintaining optical alignment between the free-space optics 1219 and the switching element 1210. The fixed mount 1230, which is schematically illustrated as a block, typically includes a rigid post, which is fixedly attached to the base and fixedly attached to the optical bench. For example, in one embodiment the fixed mount 1230 is a glass post having a square, circular, hexagonal, or other cross-section, which is epoxied or glass soldered to both the base and the optical bench. In another embodiment the fixed mount 1230 is a metal post fabricated from a low CTE material such as Kovar™ or Invar™, which is epoxied or mechanically fastened to the base and the optical bench. The movable mount 1240 includes a piston that provides a relatively large movement in a direction parallel to the y-axis. The piston includes a first end that is inserted in an opening in the optical bench, and a second end that is attached to a movable post.

In each of the above-described embodiments, the combination of one or more movable mounts with one or more fixed mounts significantly reduces stresses caused by CTE mismatch between the optical bench and the enclosure, to which a switching engine (e.g., MEMS, LC, LCoS, or other) is attached. Since the fixed and movable mounts provide reasonable stiffness in a direction perpendicular to the plane at which the largest expansion-contraction occurs, the WSS can be exposed to vibration and/or impact without significant affects on the optical performance and/or long term stability of the device.

In each of the above-described embodiments, each movable mount has been shown to include a rigid post that is fixedly attached to the base. While providing flexible attachment points at the top of a rigid post is relatively easy to implement and is advantageous for reducing out-of-plane movement of the optical bench, in other embodiments of the instant invention flexible attachment points are otherwise provided.

In each case, the placement and/or stiffness of the movable mounts will be typically selected in dependence upon the size of the optical bench, the desired temperature operating range, and/or possible modal frequencies upon impact. In general, positioning at least one fixed mount in close proximity to the switching engine and one or more movable mounts in remote locations from the switching engine advantageously allows the optics to track the switching engine with changes in temperature. More specifically, it allows the image of the dispersed wavelengths to be focused on the array of switching elements (e.g., micromirrors), thus reducing ITU shifts, and eliminating the need for complex, active compensation mechanisms.

Of course, the above embodiments have been provided as examples only. It will be appreciated by those of ordinary skill in the art that various modifications, alternate configurations, and/or equivalents will be employed without departing from the spirit and scope of the invention. For example, while only one fixed mount has been shown in the above-described embodiments, it is also possible for the WSS module to include two fixed mounts. Accordingly, the scope of the invention is therefore intended to be limited solely by the scope of the appended claims.

What is claimed is:

1. A wavelength selective switch module comprising:
an enclosure including a base, a sidewall, and a lid;
an optical input port for receiving an input optical signal, the input optical signal including a plurality of wavelength channels;
an optical output port for transmitting an output optical signal, the output optical signal including at least one wavelength channel in the plurality of wavelength channels;
an optical switching engine attached to the base within the enclosure, the optical switching engine including an array of switching elements for directing the at least one wavelength channel from the optical input port to the optical output port; and
an optical bench attached to the base within the enclosure, the optical bench supporting a plurality of optical components for optically coupling the optical input port to the array of switching elements and the optical output port, the plurality of optical components including a dispersive element for dispersing the input optical signal into the plurality of wavelength channels;
wherein the optical bench is attached to the base with a plurality of mounts, the plurality of mounts including at least one movable mount supporting movement of the optical bench in a plane parallel to the optical bench and at least one fixed mount maintaining optical alignment between the dispersive element and the array of switching elements.

2. A wavelength selective switch module according to claim 1, wherein the at least one fixed mount includes a fixed mount attached to the base at a distance from the optical switching engine selected to maintain optical alignment between the dispersive element and the array of switching elements.

3. A wavelength selective switch module according to claim 2, wherein the at least one movable mount includes first and second movable mounts attached to the base at distances from the optical switching engine that are larger than the distance of the fixed mount from the optical switching engine.

4. A wavelength selective switch module according to claim 1, wherein each movable mount includes a rigid post fixedly attached to the base and a resilient connector coupling the rigid post to the optical bench.

5. A wavelength selective switch module according to claim 4, wherein the resilient connector includes at least one of a pliant adhesive and an elastic insert.

6. A wavelength selective switch module according to claim 4, wherein the resilient connector includes a flexible arm.

7. A wavelength selective switch module according to claim 6, wherein the flexible arm is an extension of the optical bench.

8. A wavelength selective switch module according to claim 4, wherein the resilient connector includes a flexible clip.

9. A wavelength selective switch module according to claim 8, wherein the flexible clip includes a band of material that is looped around the rigid post such that the band of material surrounds the rigid post on at least three sides, the band of material being attached to the optical bench at an outside edge of the loop and to the rigid post at an inside edge of the loop.

10. A wavelength selective switch module according to claim 4, wherein the resilient connector includes a piston.

11. A wavelength selective switch module according to claim 4, wherein the resilient connector is fabricated with dimensions and from a material selected to minimize movement of the optical bench in direction perpendicular to the plane parallel to the optical bench.

12. A wavelength selective switch module according to claim 4, wherein the resilient connector is fabricated with dimensions and from a material selected to permit a largest of amount of movement of the optical bench in a direction parallel to a longitudinal axis of the optical bench.

13. A wavelength selective switch module according to claim 1, wherein the optical switching engine comprises one of a MEMS array and a LC array.

14. A wavelength selective switch module according to claim 1, wherein the optical switching engine is attached to the base at a location between a plurality of connector pins extending through the base.

15. A wavelength selective switch module according to claim 1, wherein the plurality of mounts includes a fixed mount disposed in close proximity to the optical switching engine, and first and second movable mounts disposed in remote positions from the optical switching engine.

16. A wavelength selective switch module according to claim 1, wherein the plurality of mounts support sufficient movement of the optical bench in the plane parallel to the optical bench to accommodate differences in thermal expansion coefficients between the optical bench and the base.

17. A wavelength selective switch module according to claim 1, wherein the plurality of mounts provides a fixed attachment point and two flexible attachment points.

18. A wavelength selective switch module comprising:
an enclosure including a base, a sidewall, and a lid;
an optical input port for receiving an input optical signal, the input optical signal including a plurality of wavelength channels;
an optical output port for transmitting an output optical signal, the output optical signal including at least one wavelength channel in the plurality of wavelength channels;
an optical switching engine attached to the base within the enclosure, the optical switching engine including an array of switching elements for directing the at least one wavelength channel from the optical input port to the optical output port; and
an optical bench attached to the base within the enclosure, the optical bench supporting a plurality of optical components for optically coupling the optical input port to the array of switching elements and the optical output port, the plurality of optical components including a dispersive element for dispersing the input optical signal into the plurality of wavelength channels;
wherein the optical bench is attached to the base with at plurality of mounts, the plurality of mounts including at least one movable mount supporting movement of the optical bench in a plane parallel to the optical bench and at least one fixed mount anchoring the optic bench to the base in close proximity to the switching engine.

19. A wavelength selective switch comprising:
a housing having a base, sidewalls and a cover;
optical input and output ports for receiving input optical signals and transmitting output optical signals;
an optical bench for supporting a plurality of optical components including a dispersion element for dispersing the input optical signals into individual wavelength channels and for combining selected groups of the wavelength channels into the output optical signals, and lensing elements for collimating and focusing the input, output and dispersed optical signals;
an array of switching elements mounted on the base of the housing for redirecting the dispersed wavelength channels to selected output ports;
wherein the optical bench is connected to the base of the housing at three attachment points;
wherein the attachment point nearest the array of switching elements is a fixed attachment point to substantially restrict any relative movement between the optical components on the optical bench and the switching elements; and
wherein the other two attachment points are flexible attachment points to enable relative movement between the optical bench and the base of the housing, thereby accommodating for differences in thermal expansion coefficients between the optical bench and the housing.

* * * * *